No. 660,578. Patented Oct. 30, 1900.
P. KNOCH.
METHOD OF MANUFACTURING CORRUGATED ROOFING OR THE LIKE FROM FELT, CANVAS, &c.
(Application filed June 9, 1899.)
(No Model.)
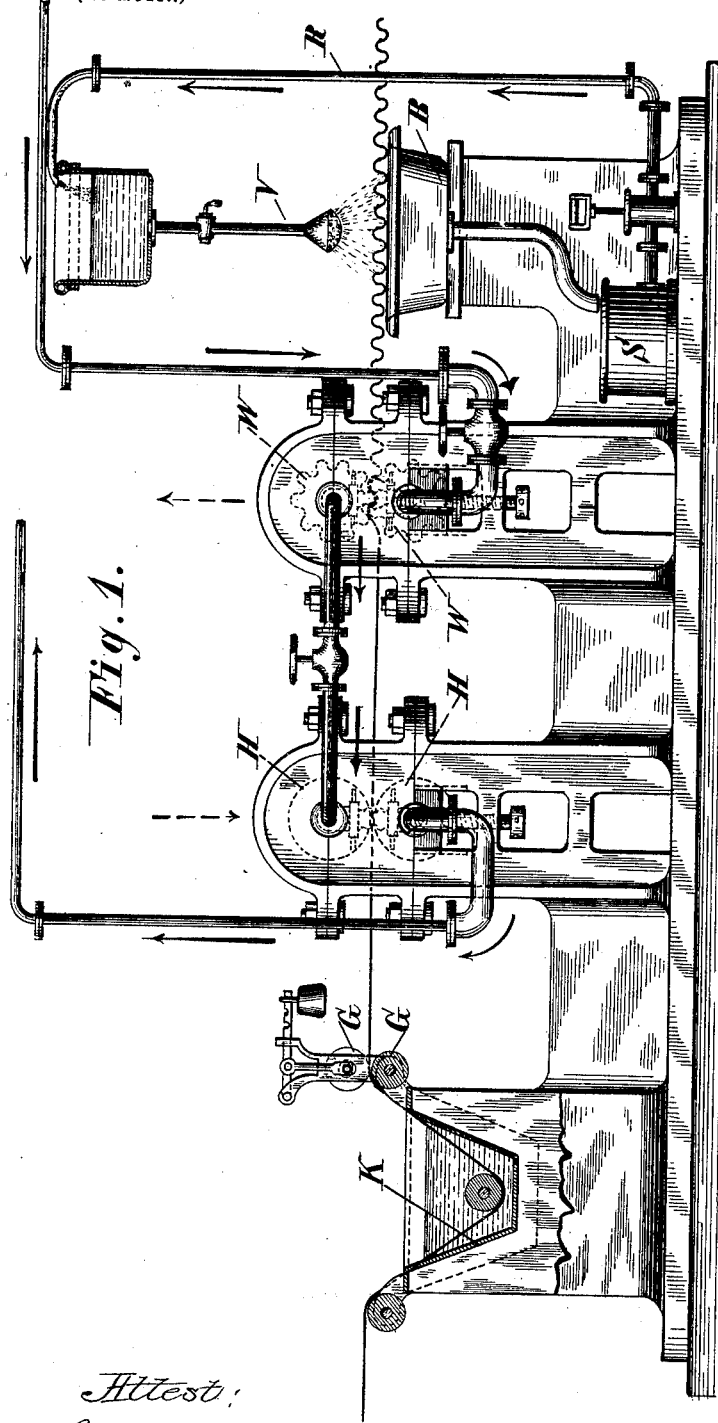
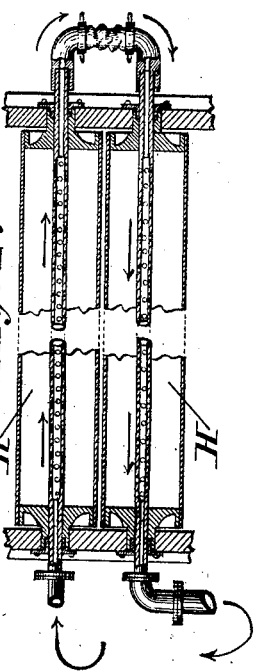

UNITED STATES PATENT OFFICE.

PAUL KNOCH, OF BERLIN, GERMANY.

METHOD OF MANUFACTURING CORRUGATED ROOFING OR THE LIKE FROM FELT, CANVAS, &c.

SPECIFICATION forming part of Letters Patent No. 660,578, dated October 30, 1900.

Application filed June 9, 1899. Serial No. 719,911. (No specimens.)

*To all whom it may concern:*

Be it known that I, PAUL KNOCH, a subject of the Emperor of Germany, and a resident of Berlin, in the German Empire, have invented certain new and useful Improvements in Methods of Manufacturing Corrugated Roofing and the Like from Felt, Canvas, &c., of which the following is a specification.

This invention has for its object a new or improved method of manufacturing corrugated roofing or isolating plates, which are particularly adapted for covering the span-roofs of railway-stations, locomotive, carriage, and similar sheds, and can also with advantage be employed for forming thoroughly-reliable isolating beds in walls, ceilings, &c., for the purpose of deadening sound and excluding dampness, cold, and other atmospheric influences.

The accompanying drawings illustrate an apparatus for carrying out the said process.

In the drawings, Figure 1 is a side elevation, and Fig. 2 a sectional detail.

The corrugated plates are manufactured in the following manner: Either lengths of felt of suitable thickness are chosen or lengths of a material like jute, bagging, or canvas superposed to each other and sewed together are employed. The lengths of material are run under a roller through a caldron K, filled with chrome-gelatin, whereafter they pass between a pair of squeezing-rollers G, which are regulated by means of an adjustable weight, for the purpose of squeezing out the excess of gelatin. After leaving the rollers the lengths of material pass between a pair of warmed rollers H, which serve the purpose of half drying the stuff, and then the stuff passed under the also-heated fluting or corrugating rollers W, by which they are corrugated and simultaneously pressed hard and dry, and finally the stuff passes a spraying contrivance V, by which they are lightly sprinkled over their whole width with a solution of acetate of alumina in order to make them waterproof. The excess of this solution as it flows off the cloth or other material is caught in a flat receptacle B, provided under the running stretch of material, and runs from there into a collecting-box S, from where it can be pumped back into the reservoir through a pipe R. After passing the corrugating-rollers and being sprinkled with a solution of acetate of alumina the sheet retains absolutely the form given to it, and so as to make the same more durable and impervious to the influences of the weather, &c., the outside of the same is covered with roofing-pitch, asphaltum, or similar material, while the inner surface—*i. e.*, that directed toward the interior of the space to be roofed or isolated—receives a coating of oil-paint, which firmly adheres to the rough surface of the felt. When fixed in position upon the roof-framing, the plates have very great bearing capacity and firmness.

The technical characteristics and advantages of the plates when compared with the ordinary metal roofing-plates, especially when used for span-roofs of railway-stations, are as follows: the previously-unattainable lightness of the plates, whereby the dead-weight of the roof is greatly reduced. This fact is to be considered in the construction of the framework of the roof and will result in great economy in iron or other material used for constructing the said framework. A further important advantage consists in the new plates having a practically-unlimited durability, as they are perfectly indifferent against acidiferous fumes, especially the sulfurous acid of the smoke of locomotives, a quality not possessed by the zinc and iron roofing-plates hitherto in almost general use. The considerably-greater durability of the new plates further effects considerable economy in the annual outlay for repairs. The iron or zinc roofing of railway-stations requires more frequent repairs and complete renewal, owing to inferior lasting qualities.

Having now particularly described and ascertained the nature of this invention and in what manner the same is to be performed, I declare that what I claim is—

The herein-described method of manufacturing corrugated plates for roofing and isolating purposes, consisting in saturating layers of suitable fabric with chrome-gelatin, partially drying said layers, simultaneously heating and pressing said layers into corrugated form, drying said layers or plates and finally treating them with acetate of alumina, substantially as described.

In witness whereof I have hereunto set my hand in presence of two witnesses.

PAUL KNOCH.

Witnesses:
HENRY HASPER,
WOLDEMAR HAUPT.